United States Patent
Kim et al.

(10) Patent No.: US 10,730,453 B2
(45) Date of Patent: Aug. 4, 2020

(54) GARNISH AND VEHICLE DOOR INCLUDING THE SAME

(71) Applicants: HYUNDAI MOTOR COMPANY, Seoul (KR); KIA MOTORS CORPORATION, Seoul (KR)

(72) Inventors: Dong Han Kim, Yongin-si (KR); Kyung Soon Jang, Ansan-si (KR); EunPyo Hong, Seongnam-si (KR); Wansu Park, Jeollanam-do (KR)

(73) Assignees: HYUNDAI MOTOR COMPANY, Seoul (KR); KIA MOTORS CORPORATION, Seoul (KR)

( * ) Notice: Subject to any disclaimer, the term of this patent is extended or adjusted under 35 U.S.C. 154(b) by 426 days.

(21) Appl. No.: 15/372,286

(22) Filed: Dec. 7, 2016

(65) Prior Publication Data
US 2018/0099626 A1 Apr. 12, 2018

(30) Foreign Application Priority Data
Oct. 11, 2016 (KR) .................. 10-2016-0131168

(51) Int. Cl.
*B60R 13/02* (2006.01)
*B60J 5/04* (2006.01)

(52) U.S. Cl.
CPC ............ *B60R 13/0243* (2013.01); *B60J 5/04* (2013.01)

(58) Field of Classification Search
CPC ................................. B60R 13/0243
USPC ................................... 296/146.7
See application file for complete search history.

(56) References Cited

U.S. PATENT DOCUMENTS

| | | | | |
|---|---|---|---|---|
| 4,779,390 A | * | 10/1988 | Repper | B60R 13/02 296/39.2 |
| 6,093,272 A | * | 7/2000 | Visconti | B29C 45/14508 156/212 |
| 6,832,430 B1 | * | 12/2004 | Ogawa | B05D 1/32 29/460 |
| 9,162,635 B2 | | 10/2015 | Hazawa et al. | |
| 2003/0141711 A1 | | 7/2003 | Inoue et al. | |
| 2012/0256345 A1 | * | 10/2012 | Smith | B29C 45/14778 264/279 |
| 2015/0130204 A1 | | 5/2015 | Takezawa et al. | |
| 2016/0082881 A1 | * | 3/2016 | Yamato | B60Q 3/217 362/511 |

(Continued)

FOREIGN PATENT DOCUMENTS

| | | |
|---|---|---|
| JP | 2005-47375 A | 2/2005 |
| JP | 2009-274476 A | 11/2009 |
| JP | 2010-500938 A | 1/2010 |

(Continued)

*Primary Examiner* — Hilary L Gutman
(74) *Attorney, Agent, or Firm* — Lempia Summerfield Katz LLC (57) ABSTRACT

A vehicle door includes a door panel, a door trim mounted at an inner side of the door panel, and a garnish mounted on the door trim. The garnish includes a first region and a second region. The first region forms a part of an external surface of the garnish and has a first pattern layer. The second region forms another part of the external surface of the garnish and has a second pattern layer. The garnish includes a groove provided between the first region and the second region. The second region is formed to protrude relative to the first region and includes a smooth surface.

8 Claims, 8 Drawing Sheets

(56) References Cited

U.S. PATENT DOCUMENTS

2019/0389104 A1\* 12/2019 Heikkila ........... B29C 45/14688
2020/0079189 A1\* 3/2020 Kito ........................ C08L 23/02

FOREIGN PATENT DOCUMENTS

| JP | 5514813 B2 | 6/2014 | |
|---|---|---|---|
| KR | 1998-055488 U | 10/1998 | |
| KR | 10-2016-0082735 A | 7/2016 | |
| WO | WO-2014089328 A1 \* | 6/2014 | ............... B32B 5/02 |

\* cited by examiner

GARNISH AND VEHICLE DOOR INCLUDING THE SAME

CROSS-REFERENCE TO RELATED APPLICATION

This application claims the benefit of Korean Patent Application No. 10-2016-0131168, filed on Oct. 11, 2016 in the Korean Intellectual Property Office, the disclosure of which is incorporated herein by reference.

BACKGROUND

1. Field

Embodiments of the present disclosure relate to a garnish and a vehicle door including the same, and more particularly, to a garnish mounted on a vehicle door.

2. Description of the Related Art

In general, a garnish, a molding, or the like is attached to a vehicle door for making an exterior or interior elegant or reinforcing strength, and enhancing user convenience.

Specifically, a door trim configured to cover the inside of a door panel is mounted on a vehicle door. The door trim can have functions of sound insulation, sound absorption, and protecting passengers when a crash occurs, as well as interior decoration. An inside handle configured to open a door and a pull handle configured to pull and close a door can be provided at the door trim. In addition, an arm rest and a door pocket can be provided at the door trim.

In addition, a window opening and closing switch, a door locking and unlocking switch, a side mirror adjusting switch, a seat adjusting switch, a trunk opening switch, and the like can be provided at the door trim, and a garnish or molding can be attached to the door trim for interior decoration.

Meanwhile, the garnish attached to the door trim can include a molding attached to an edge thereof. The molding can be provided for a seam of the garnish for hiding the seam or for making the seam appearance elegant.

The disclosure of this section is to provide background of the invention. Applicant notes that this section may contain information available before this application. However, by providing this section, Applicant does not admit that any information contained in this section constitutes prior art.

SUMMARY

One aspect of the present disclosure provides a garnish of a vehicle door with which a molding is formed integrally.

Another aspect of the present disclosure provides a vehicle door including a garnish with which a molding is formed integrally.

Still another aspect of the present disclosure provides a method of manufacturing a garnish with which a molding is formed integrally.

Additional aspects of the disclosure will be set forth in part in the description which follows and, in part, will be obvious from the description, or may be learned by practice of the disclosure.

In accordance with one aspect of the present disclosure, a vehicle door includes a door panel, a door trim mounted at an inner side of the door panel, and a garnish mounted on the door trim, wherein the garnish includes a first region configured to form a part of an external surface of the garnish and having a first pattern layer, and a second region configured to form another part of the external surface of the garnish and having a second pattern layer.

The second region may be formed to protrude relative to the first region.

The second region may further include a rounding at a corner portion thereof.

The first region may further include a groove provided at a boundary between the first region and the second region.

The second pattern layer may include a decoration layer and a top coating layer.

The decoration layer may include a metal thin film.

The second region may include a smooth surface, and only the smooth surface may include the second pattern layer.

The second region may further include the first pattern layer below the second pattern layer.

In accordance with another aspect of the present disclosure, a garnish, which is mounted at an inner side of a vehicle door, includes a first region configured to form a part of an external surface thereof and including a first pattern layer, and a second region configured to form another part of the external surface thereof and including a second pattern layer.

The second region may be formed to protrude relative to the first region.

The first region may further include a groove provided at a boundary between the first region and the second region, and the second region may further include a rounding at a corner portion thereof.

The second region may include a smooth surface, and only the smooth surface may include the second pattern layer.

The second region may further include the first pattern layer below the second pattern layer.

In accordance with still another aspect of the present disclosure, a method of manufacturing a garnish mounted at an inner side of a vehicle door includes forming the garnish, forming a first pattern layer on the formed garnish, and forming a second pattern layer on a partial region of the garnish having the first pattern layer.

The garnish may be formed such that the partial region, in which the second pattern layer is formed, protrudes relative to other regions.

The garnish may be formed such that a rounding is provided at a corner portion of the partial region in which the second pattern layer is formed, and the garnish may be formed to further include a groove provided along a boundary of the partial region in which the second pattern layer is formed.

The first pattern layer may be transferred by a water transfer printing method.

The second pattern layer may be formed by a hot stamping method.

The partial region of the garnish, in which the second pattern layer is formed, may be formed to have a smooth surface, and the second pattern layer may be transferred on the smooth surface by a hot stamping method utilizing rolling.

The second pattern layer may be transferred by a hot stamping method utilizing a press.

BRIEF DESCRIPTION OF THE DRAWINGS

These and/or other aspects of the disclosure will become apparent and more readily appreciated from the following description of the embodiments, taken in conjunction with the accompanying drawings of which.

DETAILED DESCRIPTION

Embodiments described in this specification and configurations illustrated in drawings are exemplary examples of the disclosed disclosure. The disclosure covers various modifications that can substitute for the embodiments and drawings herein at the time of filing of this application In addition, the same reference numerals or symbols refer to parts or components that substantially perform the same function.

In addition, the terms used in the present specification are merely used to describe exemplary embodiments and are not intended to limit and/or restrict embodiments. An expression used in the singular encompasses the expression of the plural unless it has a clearly different meaning in context. In the present specification, the terms such as "including," "having," and "comprising" are intended to indicate the existence of the features, numbers, steps, actions, components, parts, or combinations thereof disclosed in the specification and are not intended to preclude the possibility that one or more other features, numbers, steps, actions, components, parts, or combinations thereof may exist or may be added.

In addition, it should be understood that, although the terms "first," "second," etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

Hereinafter, embodiments of the present disclosure will be described with reference to the accompanying drawings in detail.

A trim piece or garnish 100 for a vehicle interior cabin is provided. The garnish 100 is formed from a single component having a plurality of regions and surfaces with each region and/or surface providing a different shape, texture, appearance, etc. As a result, the garnish 100 provides an ornate and detailed aesthetic appearance. That is, the garnish 100 is configured to provide the appearance of being intricately formed from a plurality of molded components rather than a single molded component.

In embodiments, the garnish 100 comprises at least a first region 110 and a second region 120. The first and second regions 110, 120 face the vehicle interior cabin and/or the driver of the vehicle. The garnish 110 provides the first and second regions 110, 120 without having the first and second regions 110, 120 provided by separate pieces. That is, in embodiments, the garnish 110 comprises a single molded piece or component. Accordingly, the garnish 100 does not have a separate molding piece connected to the garnish 100 along an edge thereof. Similarly, the garnish 100 does not have a noise preventing member disposed between the garnish 100 and a separate molding piece. The garnish 100 has a rear region facing away from the vehicle interior cabin and/or the driver of the vehicle. The rear region accommodates connection or fastening members that connect the garnish 100 to the vehicle.

Each of the first and second regions 110, 120 have sections or surfaces comprising a different shape, texture, appearance, etc. Accordingly, in embodiments, the surface of the first region 110 has a different shape, texture, and/or appearance than the surface of the second region 110. In embodiments, each of the first and second regions 110, 120 may have a plurality of sections or surfaces with each section or surface comprising a different shape, texture, appearance, etc. For example, one section of the first region 110 may have a different aesthetic appearance than a second section of the first region 110. In embodiments, the first and/or second regions 110, 120 may have a decorative layer or film adhesively applied or bonded thereon. Similarly, in embodiments, the first and/or second regions 110, 120 may have a surface treatment applied, such as but not limited to, water transfer printing, hot stamping, etc.

Figure 1:
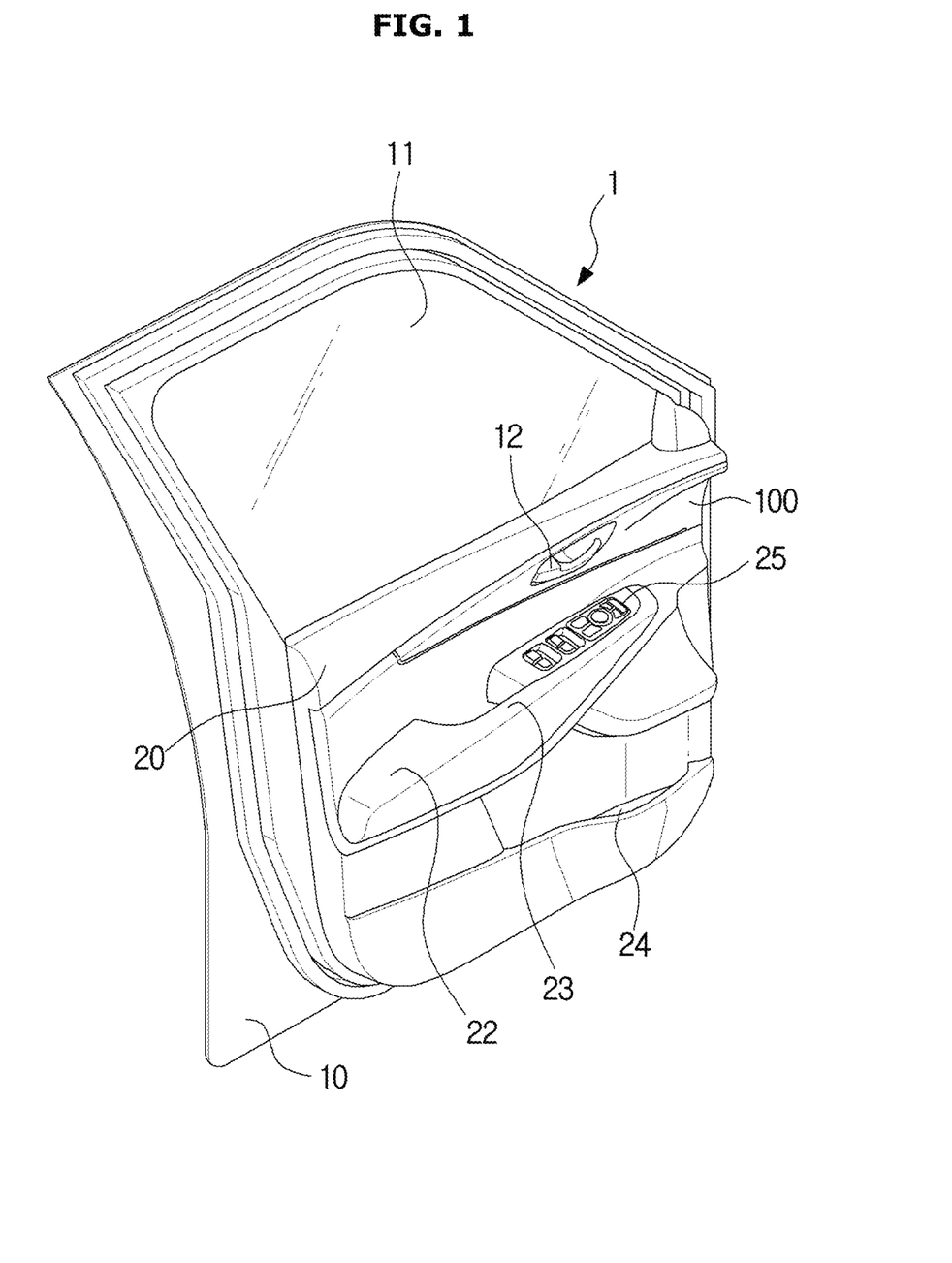
FIG. 1 is a perspective view illustrating a vehicle door including a garnish according to one embodiment of the present disclosure.

FIG. 1 is a perspective view illustrating a vehicle door including a garnish according to one embodiment of the present disclosure.

Referring to FIG. 1, vehicle doors 1 may be disposed at both sides of a vehicle for accessing an inside space of the vehicle. Each of the vehicle doors 1 may include a door panel 10 forming an exterior of the vehicle, and a door trim 20 mounted at an inside of the door panel 10. The door trim 20 may have functions of sound insulation, sound absorption, and protecting passengers when a crash occurs, as well as interior decoration.

An inside handle 21 configured to open a door and a pull handle 23 configured to pull and close the door may be provided on the door trim 20. In addition, an arm rest 22 and a door pocket 24 may be provided at the door trim 20.

A window 11, a side mirror for watching the rear, and a door locking device configured to lock or unlock the door may be provided at the vehicle door 1, and various switches 25, such as a window opening and closing switch, a door locking and unlocking switch, and a side mirror control switch, may be provided at the door trim 20 of the door 1. In addition, various switches, such as a trunk opening switch and a seat control switch as well as various apparatuses mounted on the door 1 may be additionally provided at the door trim 20.

A garnish, a molding, or the like may be attached to an external surface of the door panel 10 for making the exterior elegant, reinforcing strength of the door panel 10, or enhancing user convenience. In addition, a garnish 100, a molding, or the like may also be attached to the door trim 20 for interior decoration of the vehicle.

A garnish is referred to various ornaments attached to a vehicle body and serves to protect an external surface and reinforce strength of the vehicle as well as decoration of the vehicle body. A molding is also a kind of ornament attached to a vehicle body and mainly refers to members in shapes of stripes in which horizontal, vertical, diagonal, and curved lines are repeated. The molding serves to provide an aesthetic sense on a plain surface of an exterior or interior of a vehicle and visual balance with other parts, by making a surface thereof non-uniform. In addition, the molding is also attached to an edge of the garnish to serve as a seam of the garnish for hiding the seam or to for making the seam appearance elegant.

A garnish and a molding are not clearly distinguished. That is, the molding may be classified as a kind of the garnish, and the garnish may be referred to as a name including the molding. For the sake of convenience in the description, in the present specification, the garnish 100 is defined to include a molding forming at least a partial edge of the garnish 100.

Figure 2:
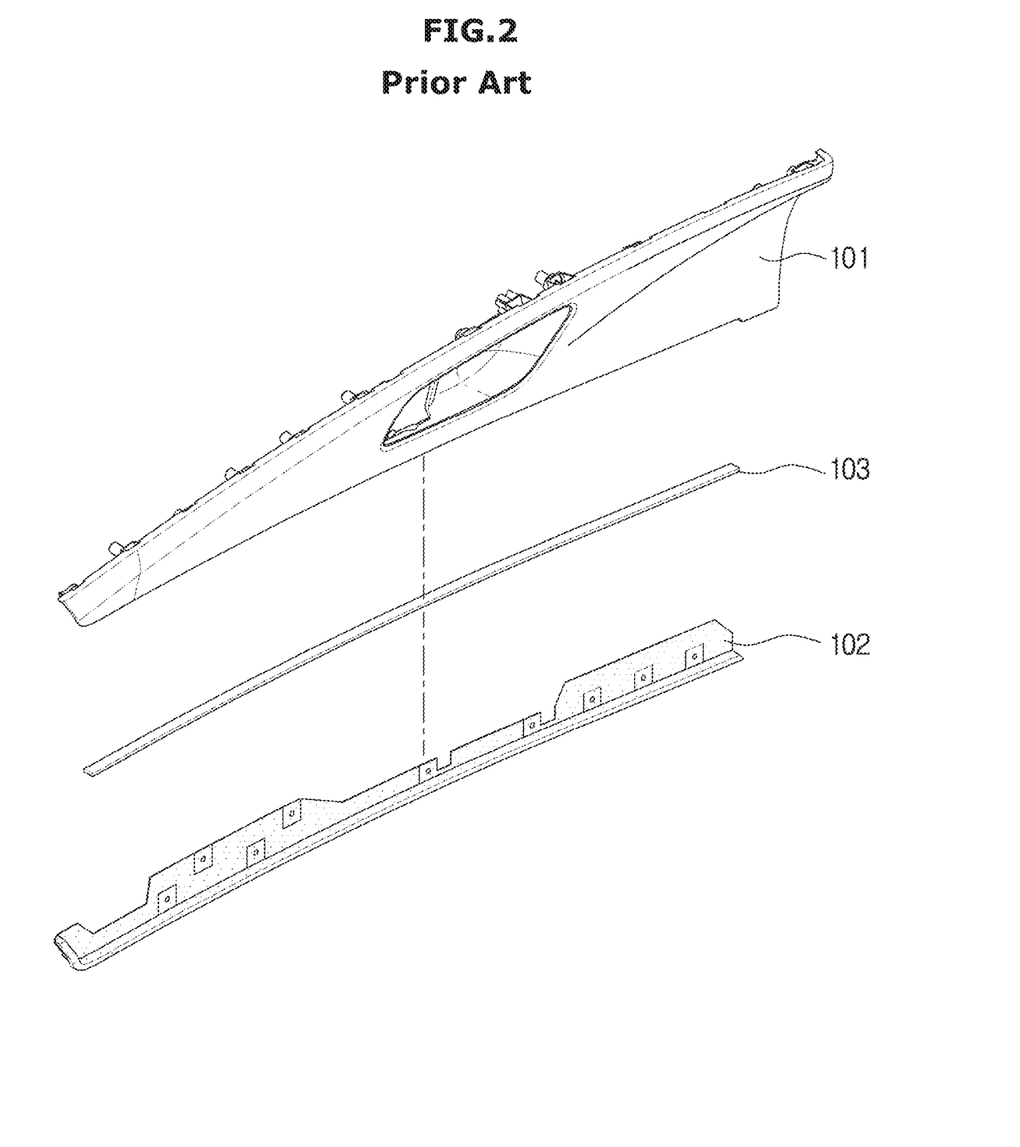
FIG. 2 is an exploded perspective view illustrating a conventional garnish.
Figure 3:
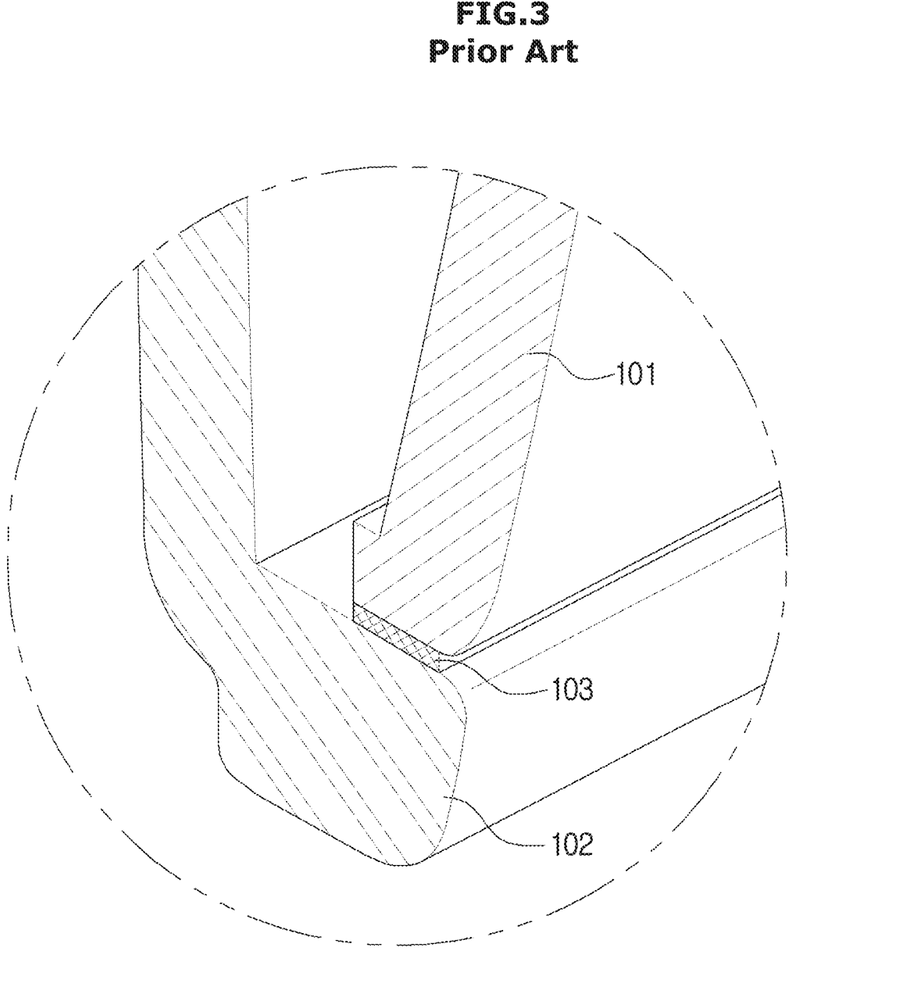
FIG. 3 is a perspective view illustrating a cross section of the conventional garnish.

FIG. 2 is an exploded perspective view illustrating a conventional garnish, and FIG. 3 is a perspective view illustrating a cross section of the conventional garnish.

Referring to FIGS. 2 and 3, a conventional garnish 100 includes a garnish body 101 and a molding 102 attached to the garnish body 101. That is, in the conventional case, the garnish body 101 and the molding 102 are individually manufactured, the garnish body 101 and the molding 102 are assembled to complete the garnish 100, and the completed garnish 100 is mounted on the door trim 20 of the vehicle door 1.

Since the conventional garnish 100 is formed by assembling the garnish body 101 and the molding 102, noise may be generated at a portion at which the garnish body 101 is in contact with the molding 102 due to vibrations of a vehicle generated during driving. Accordingly, to prevent noise generated between such parts, a noise preventing member 103, such as felt, is required to be disposed between the garnish body 101 and the molding 102. In addition, a surface of the molding 102 is generally treated by chrome plating and the like, but environment may be negatively influenced by such a plating process that uses a heavy metal such as chrome.

Accordingly, to solve the problems of the conventional garnish 100 and a manufacturing process thereof, the garnish 100 according to the present disclosure may be manufactured by integrally forming the garnish body 101 and the molding 102.

Figure 4:
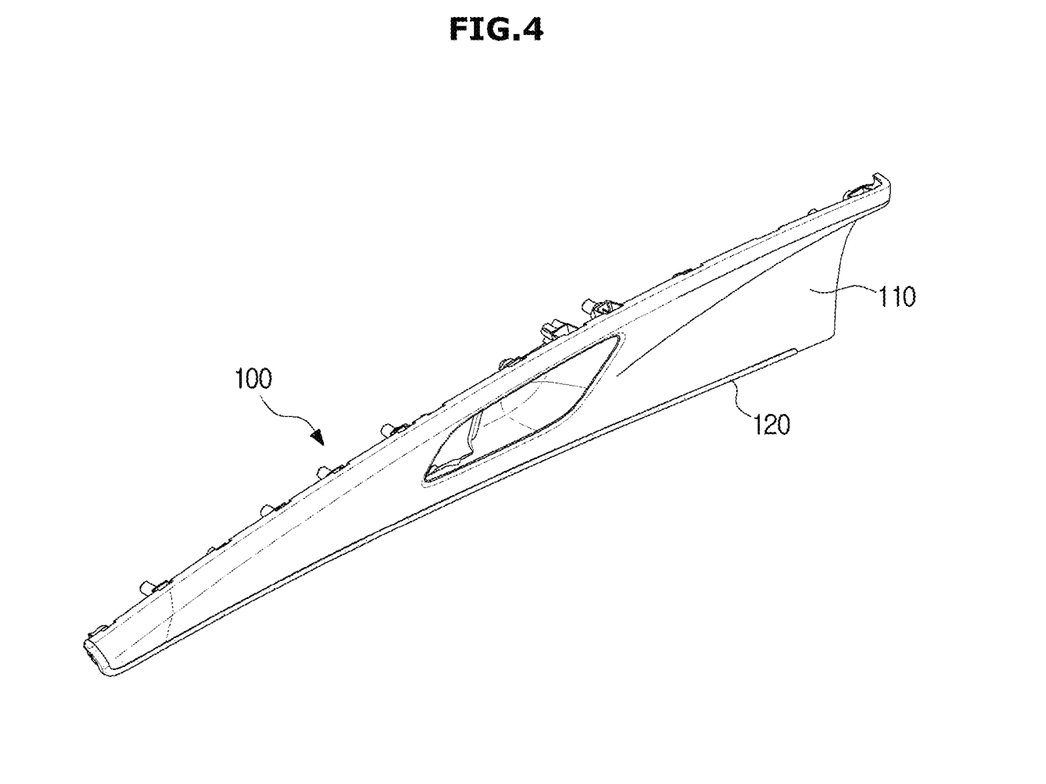
FIG. 4 is a perspective view illustrating the garnish according to one embodiment of the present disclosure.
Figure 5:
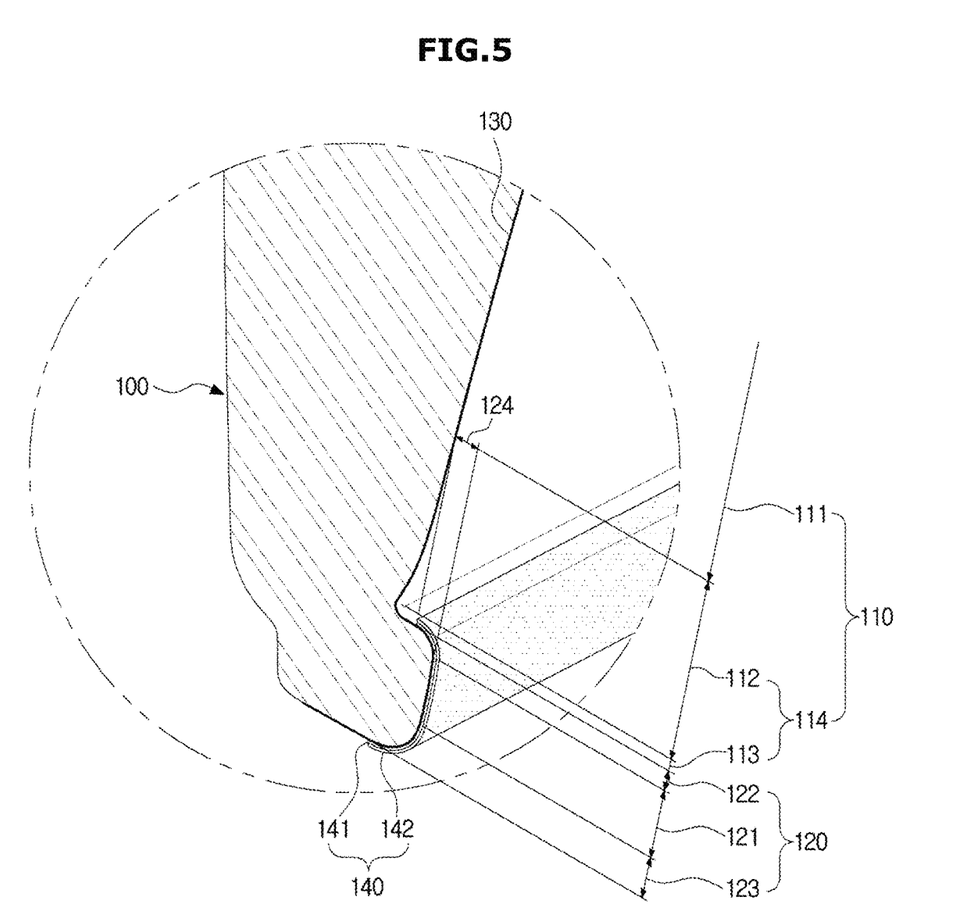
FIG. 5 is a perspective view illustrating a cross section of the garnish according to one embodiment of the present disclosure.

FIG. 4 is a perspective view illustrating a cross section of the garnish according to one embodiment of the present disclosure, and FIG. 5 is a perspective view illustrating a cross section of the garnish according to one embodiment of the present disclosure;

Referring to FIGS. 4 and 5, since the garnish 100 according to the present disclosure is formed as a single part, noise generated between parts may be prevented even without a noise preventing member and the like, such as felt. In addition, due to a decrease in the number of parts, manufacturing costs and weight may decrease, and a manufacturing process may shorten.

To provide the same aesthetic sense as that of a conventional molding, a metal thin film may be formed on a part of an external surface of the garnish 100 according to the present disclosure by a hot stamping transfer printing method. Unlike a plating process, a hot stamping transfer printing process for a metal thin film does not negatively influence on the environment.

Specifically, the garnish 100 may include a first region 110 forming a part of the external surface of the garnish 100 and a second region 120 forming another part of the external surface. The first region 110 may include a first pattern layer 130, and the second region 120 may include a second pattern layer 140.

The second region 120 may be formed to protrude by a predetermined step height 124 to form the second pattern layer 140 compared to the first region 110.

The second region 120 may include a smooth surface 121. In the present specification, the smooth surface is defined as a substantially flat surface. Accordingly, the smooth surface may be formed as a complete flat surface or may be formed as a curved surface having a small curvature.

In addition, the second region 120 may include roundings 122 and 123 at corners of the smooth surface 121 to provide the same aesthetic sense as that of a molding individually formed and attached. A first rounding 122 adjacent to the first region 110 and the second rounding 123 formed at an end of the garnish 100 may have different curvatures.

The first region 110 may include a groove 114 provided at a boundary between the first region 110 and the second region 120. Specifically, the first region 110 may include a smooth surface 111 and the groove 114, and the groove 114 may include a section 112 which extends from the smooth surface 111 and has a curvature change and a section 113 which has an inverted curvature compared to the section 112. The section 113 having the inverted curvature may be connected to the second region 120. According to one embodiment, the groove 114 may be formed such that an absolute value of the curvature increases from the section 112 in which curvature changes to the section 113 having the inverted curvature.

The groove 114 may provide the same aesthetic sense as that of second region 120 formed separately from the first region 110. Furthermore, when the second pattern layer 140 is transferred onto the second region 120 including the roundings 122 and 123 in a transfer printing process for the second pattern layer 140, the groove 114 may help a boundary line of the second pattern layer 140 to be clearly transferred.

In the second region, the second pattern layer 140 may be included in all of the smooth surface 121 and the roundings 122 and 123, or, although not illustrated in drawings, may be included only in the smooth surface 121.

The second pattern layer 140 may include a decoration layer 141 and a top coating layer 142 configured to protect the decoration layer 141. The decoration layer 141 may include a metal thin film. Since the decoration layer 141 is formed with the metal thin film, the second region 120 may provide the same aesthetic sense as that of a molding plated with chrome and the like.

The first pattern layer 130 may include various patterns including natural patterns, such as wood, marble, and leather, or abstract patterns. In addition, the second pattern layer 140 may include various color thin films or various patterns in addition to a silver-white metal thin film such as chrome.

Since the first pattern layer 130 is formed in an overall region of the external surface of the garnish 100 and the second pattern layer 140 is selectively formed in the second region 120, the second region 120 may additionally include the first pattern layer 130 below the second pattern layer 140.

Figure 6:
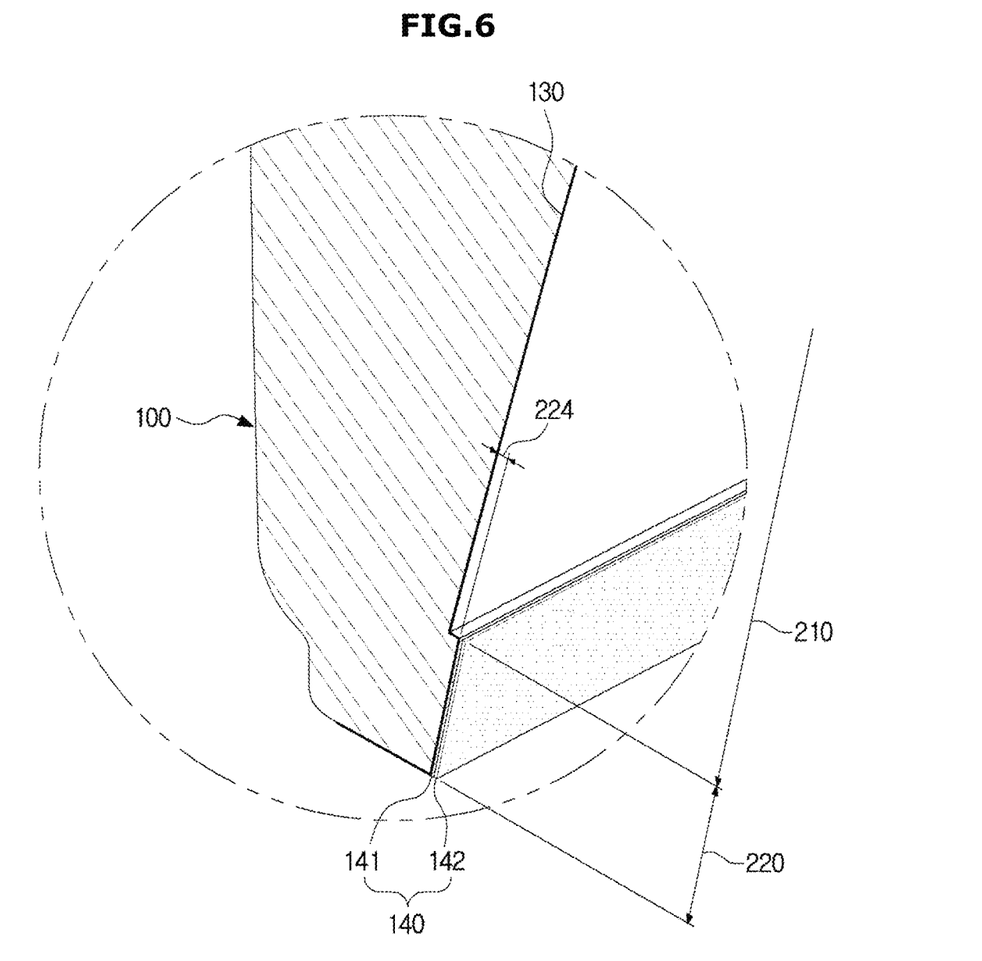
FIG. 6 is a perspective view illustrating a cross section of a garnish according to another embodiment of the present disclosure.

FIG. 6 is a perspective view illustrating a cross section of a garnish according to another embodiment of the present disclosure garnish.

Referring to FIG. 6, a garnish 100 may include a first region 210 forming a part of an external surface of the garnish 100 and a second region 220 forming another part of the external surface. The first region 210 may include a first pattern layer 130, and the second region 220 may include a second pattern layer 140.

The second region 220 may be formed to protrude by a predetermined step height 224 to form the second pattern layer 140 compared to the first region 210. The second region 220 may not have roundings at corners and may include only a smooth surface, and only the smooth surface may include the second pattern layer 140. That is, the second pattern layer 140 may be formed only on the smooth surface.

When the second region 220 is formed only with the smooth surface, a step 224 from the first region 210 may be formed to protrude less than that when corners of the smooth surface include roundings, and the second pattern layer 140 may be formed by a further simple process. In addition, even when a groove is not provided beside a boundary of the second region 220, the boundary of the second pattern layer 140 may be clearly transferred.

The second pattern layer 140 may include a decoration layer 141 and a top coating layer 142 configured to protect the decoration layer 141. The decoration layer 141 may include a metal thin film. Since the decoration layer 141 is formed with the metal thin film, the second region 220 may provide the same aesthetic as that of a molding plated with chrome, etc.

The first pattern layer 130 may include various patterns including natural patterns, such as wood, marble, and leather, or abstract patterns. In addition, the second pattern layer 140 may include various color thin films or various patterns, in addition to a silver-white metal thin film such as chrome.

Since the first pattern layer 130 is formed in at an overall region of the external surface of the garnish 100 and the second pattern layer 140 is selectively formed at the second region 220, the second region 220 may additionally include the first pattern layer 130 below the second pattern layer 140.

Hereinafter, a method of manufacturing a garnish will be described.

Figure 7:
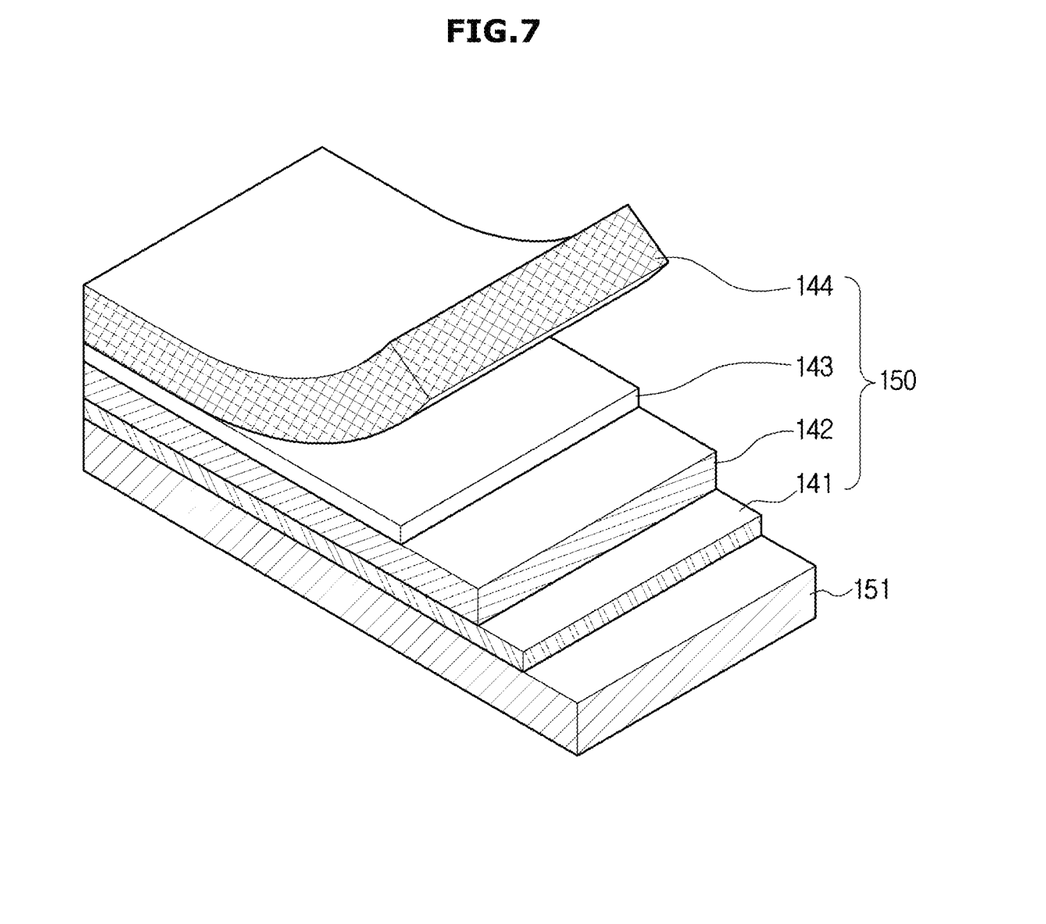
FIG. 7 is a view illustrating a structure of a hot stamping transfer film.
Figure 8:
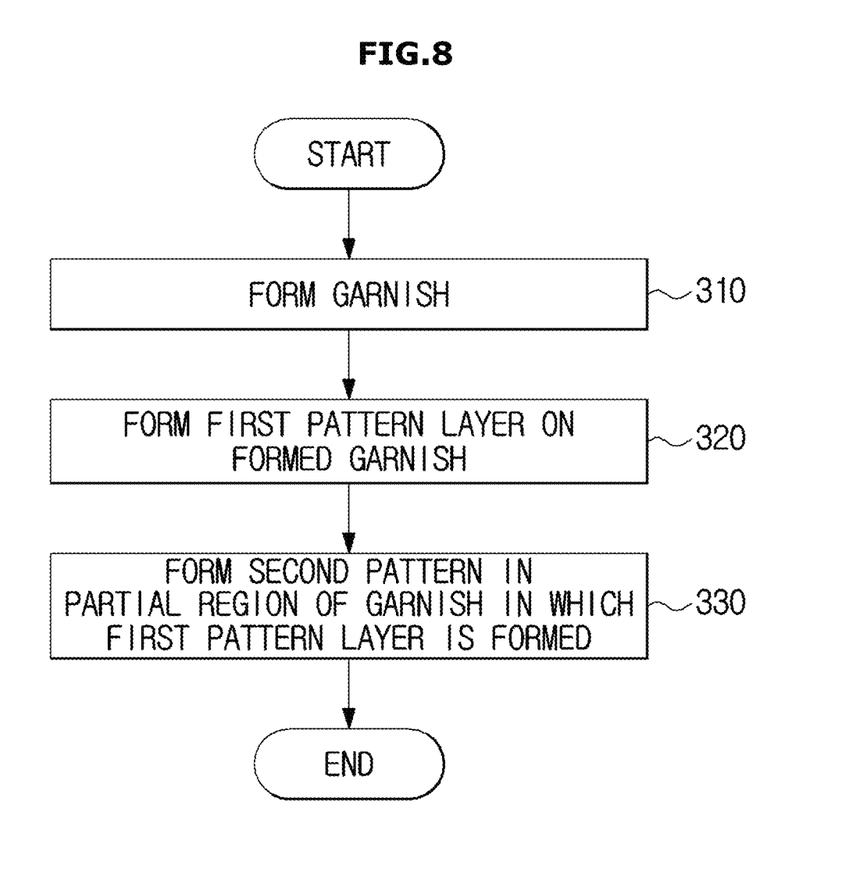
FIG. 8 is a flowchart of a method of manufacturing the garnish according to one embodiment of the present disclosure.

FIG. 7 is a view illustrating a structure of a hot stamping transfer film, and FIG. 8 is a flowchart of a method of manufacturing the garnish according to one embodiment of the present disclosure.

Referring to FIG. 7, a film 150 used for hot stamping transfer printing may include the decoration layer 141, the top coating layer 142, a release sheet 143, and a carrier 144. The carrier 144 configured to carry the decoration layer 141, the top coating layer 142, and the release sheet 143 is formed of a thermoplastic plastic such as polyethylene terephthalate (PET), and is removed in a last operation of a transfer printing process.

The decoration layer 141 may be formed with a metal thin film which has various colors or a thin film layer which has various patterns to provide an aesthetic sense to a transfer target surface 151. The top coating layer 142 may be provided to protect the decoration layer 141 to improve durability.

The release sheet 143, which is a layer attached to protect the decoration layer 141 and the top coating layer 142 transferred to the transfer target surface 151 until a product is completed, may be removed in a finishing operation for the product or may be removed by a user. That is, the second pattern layer 140 is transferred to the garnish 100, the garnish 100 is assembled to a door trim 20, and then the release sheet 143 may be removed. The release sheet 143 may be generally manufactured with a craft paper of which one or both surfaces are painted with a silicone resin emulsion.

Referring to FIG. 8, the method of manufacturing a garnish mounted at an inner side of a vehicle door includes forming the garnish 100 using injection molding (310) as a first operation. As illustrated in FIGS. 5 and 6, the garnish 100 may be formed such that a partial region 120 or 220, in which the second pattern layer 140 will be formed, protrudes relative to another region 110 or 210.

In addition, as illustrated in FIG. 5, the garnish 100 may be formed such that the roundings 122 and 123 are provided at corner portions of the partial region 120 in which the second pattern layer 140 will be formed and a groove 114 is included therein along a boundary of the partial region 120 in which the second pattern layer 140 will be formed.

Meanwhile, as illustrated in FIG. 6, the garnish 100 may be formed such that the partial region 220 in which the second pattern layer 140 will be formed has a smooth surface.

After the formed garnish 100 is processed in a pretreatment process, a basic painting process, and a drying process, the first pattern layer 130 may be formed on the formed garnish 100 (320) as a next process. The first pattern layer 130 may be transferred by a water transfer printing method.

The water transfer printing method includes floating a transfer film on water, activating the transfer film in a liquid state, soaking a transfer target therein, and transferring the activated transfer film on a surface of a material and may transfer a three dimensional curved surface. Since the water transfer printing method may perform a transfer regardless of quality of a material such as plastic, a metal, a ceramic, or glass, there is a merit in that material selection is free. In addition, various patterns including natural patterns, such as wood, marble, and leather, or abstract patterns may be transferred.

After the first pattern layer 130 is formed on the external surface of the garnish 100, an additional surface coloring and protection painting process and a drying process may be performed. As a next operation, the second pattern layer 140 may be formed in the partial region 120 or 220 of the external surface of the garnish 100 having the first pattern layer 130 (330).

The second pattern layer 140 may be formed by the hot stamping method. The hot stamping transfer printing method includes transferring patterns, such as characters or patterns, to a transfer target object from a foil or film, on which a metal is deposited or coloring is applied, by heating or pressing. Since a transfer film and the like are easily exchanged in the hot stamping transfer printing method, the second pattern layer 140 may be formed with various color thin films or in various patterns, in addition to a silver-white metal thin film such as chrome.

As illustrated in FIG. 5, when corner portions of the external surface of the partial region 120 of the garnish 100, in which the second pattern layer 140 will be formed, include the roundings 122 and 123, the second pattern layer 140 is preferably transferred by a hot stamping method utilizing a press.

The hot stamping method utilizing a press includes first inserting the garnish 100 having the first pattern layer 130, which is a transfer target object, into a hot stamping transfer apparatus on which the transfer film 150 including the decoration layer 141 having a required pattern is mounted. The transfer film 150 is disposed between the transfer target surface 151 and a stamp.

Next, the stamp which is non-uniformly formed to correspond to a shape of the transfer target surface 151 is heated and the transfer film 150 is pressurized toward a transferring object. Since the stamp is formed of silicon material as well as is non-uniformly formed, the stamp may press the transfer film 150 such that the transfer film 150 is in tight contact with the transfer target surface 151.

Since the second region 120 of the garnish 100 illustrated in FIG. 5 includes the roundings 122 and 123, the second pattern layer 140 may be transferred by the hot stamping method utilizing a press using a stamp corresponding to such a shape.

After the stamp presses the transfer film 150 to the transfer target surface 151, the carrier 144 is separated therefrom, and the transfer printing process is finished. In the garnish 100 illustrated in FIG. 5, the first region 110 may include the groove 114 provided at the boundary between the first region 110 and the second region 120. In the process of separating the carrier 144 from the transfer film 150, the groove 114 may help boundary lines of the decoration layer 141 and the top coating layer 142 to be clearly transferred to the second region 120, which is the transfer target surface 151, and may help a portion which is not transferred to be removed with the carrier 144.

Meanwhile, as illustrated in FIG. 6, when the partial region 220 of the external surface of the garnish 100 in which the second pattern layer 140 will be formed is formed to have a smooth surface, the second pattern layer 140 may be transferred by a hot stamping method utilizing rolling.

The hot stamping method utilizing rolling includes first inserting the garnish 100 having the first pattern layer 130, which is a transfer target object, into a hot stamping transfer apparatus in which the transfer film 150 including the decoration layer 141 having a required pattern is mounted. The transfer film 150 is disposed between the transfer target surface 151 and a roller.

Next, a transferring object and the transfer film 150 are pressurized by the roller while passing through one side of the heated roller. The roller is formed of silicone material and may press the transfer film 150 such that the transfer film 150 is in tight contact with the transfer target surface 151.

After the roller presses the transfer film 150 to the transfer target surface 151, the carrier 144 is separated therefrom, and the transfer printing process is finished. Since the partial region 120 of the garnish 100 illustrated in FIG. 6 is formed to have a smooth surface, even when the step height 224 from the first region 210 is formed to protrude less than that when the corners of the smooth surface include roundings, the second pattern layer 140 may be transferred using the hot stamping method utilizing a roller, which is simpler than the press method. In addition, even when the groove is not provided beside a boundary of the second region 220, the boundary of the second pattern layer 140 may be clearly transferred by the hot stamping method utilizing a roller.

As is apparent from the above description, in a garnish and a vehicle door including the same according to the embodiments of the present disclosure, since the garnish is formed as a single part, noise, which can be generated in a garnish assembled from an individually formed main body and molding, can be removed.

In addition, in a garnish and a vehicle door including the same according to the embodiments of the present disclosure, since the number of parts decreases, production costs and weight can decrease.

A method of manufacturing a garnish according to the embodiments of the present disclosure can manufacture a garnish integrated with a molding, which provides the same aesthetic sense as that of a garnish assembled with a molding formed individually.

The scope of the present disclosure is not limited to the above-described specific embodiments. Various other embodiments that may be changed or modified by those skilled in the art without departing from the scope and spirit of the present disclosure defined by the appended claims fall within the scope of the present disclosure.

What is claimed is:

1. A vehicle door comprising:
a door panel;
a door trim mounted at an inner side of the door panel; and
a garnish mounted on the door trim,
wherein the garnish includes a first region configured to form a part of an external surface of the garnish and having a first pattern layer, and a second region configured to form another part of the external surface of the garnish and having a second pattern layer,
wherein the garnish includes a groove provided between the first region and the second region,
wherein the second region is formed to protrude by a predetermined step height to form the second pattern layer relative to the first region and includes a smooth surface,
wherein the groove includes a first section and a second section connected to the first section, the first section extending from a smooth surface of the first region and having a curved shape of which curvature is changing, the second section having a curved shape with inverted curvature compared to the first section,
wherein the curvature of the curved shape is increased from the smooth surface of the first region to the second section.

2. The vehicle door of claim 1, wherein the second region further includes a rounding at a corner portion thereof.

3. The vehicle door of claim 1, wherein the second pattern layer includes a decoration layer and a top coating layer.

4. The vehicle door of claim 3, wherein the decoration layer includes a metal thin film.

5. The vehicle door of claim 1, wherein only the smooth surface of the second region includes the second pattern layer.

6. A garnish mounted at an inner side of a vehicle door, the garnish comprising:
a first region configured to form a part of an external surface thereof and including a first pattern layer; and
a second region configured to form another part of the external surface thereof and to including a second pattern layer,
wherein the garnish includes a groove provided between the first region and the second region,
wherein the second region is formed to protrude by a predetermined step height to form the second pattern layer relative to the first region and includes a smooth surface,
wherein the groove includes a first section and a second section connected to the first section, the first section extending from a smooth surface of the first region and having a curved shape of which curvature is changing, the second section having a curved shape with inverted curvature compared to the first section,
wherein the curvature of the curved shape is increased from the smooth surface to the second section.

7. The garnish of claim 6, wherein the second region further includes a rounding at a corner portion thereof.

8. The garnish of claim 6, wherein only the smooth surface of the second region includes the second pattern layer.

\* \* \* \* \*